United States Patent [19]

Burton

[11] Patent Number: 5,248,326

[45] Date of Patent: Sep. 28, 1993

[54] METHOD OF TREATING PROPYLENE POLYMER-CONTAINING DISPOSABLE PRODUCTS AFTER USE, AND PRODUCT OF ENHANCED COMPOSTABILITY MADE THEREBY

[75] Inventor: Lester P. J. Burton, New Castle County, Del.

[73] Assignee: Himont Incorporated, Wilmington, Del.

[21] Appl. No.: 922,703

[22] Filed: Jul. 28, 1992

Related U.S. Application Data

[63] Continuation-in-part of Ser. No. 676,401, Mar. 28, 1991, abandoned.

[51] Int. Cl.$^5$ .............................................. C05F 9/04
[52] U.S. Cl. .................................................. 71/8; 71/9; 71/903; 47/9; 588/212; 435/263
[58] Field of Search .................. 435/173; 204/165; 71/8-10, 903; 47/9; 588/212

[56] References Cited

U.S. PATENT DOCUMENTS

| | | | |
|---|---|---|---|
| 3,349,018 | 10/1967 | Potts | 522/157 |
| 3,846,521 | 11/1974 | Osterholtz | 264/22 |
| 3,867,324 | 2/1975 | Clendinning et al. | 47/9 |
| 3,901,838 | 8/1975 | Clendinning et al. | 47/9 |
| 3,943,933 | 3/1976 | Gertzman | 606/227 |
| 4,110,185 | 8/1978 | Williams et al. | 522/79 |
| 4,138,298 | 2/1979 | Bobeth et al. | 522/88 |
| 4,337,181 | 6/1982 | Otey et al. | 523/128 |
| 4,374,189 | 2/1983 | Heller et al. | 430/2 |
| 4,507,415 | 3/1985 | Kasai et al. | 524/101 |
| 4,563,259 | 1/1986 | Rayner | 524/99 |
| 4,710,524 | 12/1987 | Donohue | 522/75 |

FOREIGN PATENT DOCUMENTS

| | | |
|---|---|---|
| 2473503 | 1/1981 | France . |
| 61-159437 | 7/1986 | Japan . |
| 2220944 | 1/1990 | United Kingdom . |

*Primary Examiner*—Ferris Lander

[57] ABSTRACT

A method of enhancing the compostability of waste products (i.e., products which have been discarded after use such as diapers) containing one or more propylene polymer materials by exposure to high-energy ionizing radiation in an oxidizing atmosphere, such as air, to improve the rate of the biological degradation of the propylene polymer material(s). The irradiated waste product is then contacted with living microorganisms in the presence of sufficient moisture for their growth and of an oxygen-containing gas to produce a useful compost humus.

9 Claims, No Drawings

METHOD OF TREATING PROPYLENE POLYMER-CONTAINING DISPOSABLE PRODUCTS AFTER USE, AND PRODUCT OF ENHANCED COMPOSTABILITY MADE THEREBY

This is a continuation-in-part of U.S. Ser. No. 07/676,401, filed Mar. 28, 1991, and now abandoned to Lester P. J. Burton for Method of Treating Plastics-Containing Disposable Products After Use, And Product of Enhanced Compostability Made Thereby.

FIELD OF THE INVENTION

The present invention relates to a method of treating plastics-containing disposable products, such as diapers, and to products made thereby. In particular, this invention is directed to a method of post-use treatment of waste materials containing a propylene polymer material.

BACKGROUND OF THE INVENTION

Much attention is being focused these days on the problem of the disposal of plastic wastes. Recycling of plastics is one approach that is being taken, and another approach has been to make plastics degradable by modifying their composition, i.e., by blending additives, such as starch, with the polymers used to form plastic articles.

Some consumer products manufacturers recently have been promoting the use of trash composting as a means of dealing with solid-waste disposal, and the composting of disposable diapers has been reported. However, at the present state of the at, owing to the presence in the diapers of the propylene polymer materials, which require many, many years for biological degradation so as to form a compost humus, only a portion of the diaper material, i.e., that made of cellulosic material, has been compostable at practical rates. The resulting product is an inferior compost of little value.

SUMMARY OF THE INVENTION

The present invention provides a method of enhancing the compostability of disposable propylene polymer material-containing products such as diapers, by a post-use treatment which improves the biodegradability of such products. This approach is a departure from that generally taken heretofore to promote degradation, whereby the modification of the product has been done at the time of manufacture.

The method of this invention is a method for adapting a waste product (i.e. a used product) containing at least one propylene polymer material, e.g., a collective mass or aggregate of used diapers, for conversion to compost at an accelerated rate. According to this method, the aforementioned waste product, e.g., a product containing a propylene polymer material, is exposed, in an oxygen-containing atmosphere, to high-energy ionizing radiation of sufficient intensity and duration as to oxygenate, and reduce the molecular weight of, the synthetic organic polymer(s) therein. Generally, the waste product is irradiated by an electron beam or by gamma rays at a minimum radiation dose of at least about one megarad, preferably 1 to 50 megarads, most preferably 10 to 40 megarads.

The waste product treated by this method, and also provided by this invention, is a product which is adapted to be converted to compost at an accelerated rate (in contrast to control waste products) and thus is suitable for providing a starting material for the production of useful compost.

DETAILED DESCRIPTION

The synthetic organic polymer or polymers present in the waste product which is used in the present method are those which are capable of being degraded by irradiation treatment in the presence of an oxygen-containing gas. Preferred products are those which contain a propylene polymer material, i.e., a propylene homopolymer; a random copolymer of propylene with (a) 4 to 10 wt. % ethylene, (b) 15 to 20 wt % of a $C_{4-8}$ alpha-olefin or (c) up to 20 wt %. preferably up to 15 wt %, of mixtures thereof wherein the maximum polymerized ethylene content is 5 wt %; or a heterophasic propylene polymer material of a propylene homopolymer or of the aforementioned random copolymer of propylene, which heterophasic propylene polymer material contains 10 to 60 wt. % of (i) an ethylene-propylene copolymer rubber having an ethylene content of 7 to 70 wt%, preferably from 10 to 40 wt %, optionally containing a non-conjugated diene monomer in a amount of from 1 to 10 wt. %, or (ii) ethylene-butene copolymer rubber having an ethylene content of 7 to 70 wt%, preferably from 10 to 40 wt %. The total ethylene content in such heterophasic materials if from 5 to 60, preferably from 15 to 40 wt. %. The propylene polymer material also may be an alloy or blend of the aforementioned materials with other polymeric materials. The method is applicable to the treatment of molded waste products, e.g., discarded or used propylene polymer-containing medical devices; waste products consisting of, or containing, films made from a propylene polymer material; and waste products containing, for example, a propylene polymer material in fibrous form, typically nonwoven fibrous form, e.g., as a melt-blown, spun-bonded, or air-laid fabric in discarded sanitary absorbent products for medical and hygienic uses, including diapers, sanitary napkins, and incontinence pads.

An especially preferred product of this invention is one which is obtained when the method of the invention is applied to a used multi-layered diaper, or, more practically, to a collective mass or aggregate of such diapers, containing a propylene polymer material in at least one of the diaper layers. In a typical disposable diaper, a layer of a non-woven fabric of fibers of a propylene polymer material may be present as a substantially liquid-permeable, relatively hydrophobic facing or topsheet layer. It has been found that when such a diaper, after use, is exposed to high-energy ionizing radiation according to the method of the invention, the facing or top sheet layer of the propylene polymer material in the resulting product is more amenable to composting and more readily composted than the same sheet in the same product which has not been irradiated. Moreover, to achieve a maximum degree of compostability of the diapers, the present invention contemplates applying the method to used disposable diapers having a substantially liquid-impermeable backing or backsheet layer (sometimes referred to as "cover stock") made of a film of propylene polymer material. Non-woven fibrous material of polypropylene also may be present in a minor amount, e.g., up to about 30%, in the cellulosic absorbent layer which is sandwiched between the propylene polymer material topsheet and backsheet layers.

Exposure of the waste product, e.g., a mass of used diapers, to high-energy ionizing radiation in the presence of oxygen results in an improvement in the rate of the biological degradation of the propylene polymer material, or other synthetic polymer, present in the product. The ionizing radiation used should have sufficient energy to ionize the molecular structure of the polymer and to excite atomic structure, but not sufficient to affect atomic nuclei. The ionizing radiation can be of any kind, but the most practical kinds comprise electrons and gamma rays.

The radiation dose level which will be used in any given set of circumstances will depend on such factors as the reactivity of the synthetic organic polymer present; the concentration level of any irradiation-stabilizing additives therein; the dimensions of the synthetic organic polymeric products, or polymeric portions of the products, in the mass; and the composting rate which will be acceptable in the irradiated product. Generally, a radiation dose of at least about one megarad will be required, higher doses being advisable with less-reactive polymers and more highly stabilized compositions, and with thicker and otherwise larger polymeric products or product portions, and when the allowable composting time will be at a minimum. As high a dose as is practical, e.g., about 40 megarads or more, can be used inasmuch as the more intense the irradiation, the greater the degree of degradation. Waste products containing thicker polymeric products or product portions are preferably irradiated with gamma rays. Also, higher doses should be used with such products if an irradiation source of less penetrability, e.g., an electron beam, is used. With waste products containing polymeric articles which had been irradiation-sterilized and which had been made from compositions containing irradiation stabilizers such as hindered amines, the radiation dose level used in the present method should be higher than the level of stability provided by the stabilizer. With such products, a radiation dose above about 5 megarads should be used. In general, doses from 10 to 40 megarads are most preferred.

When the waste product is a mass of used diapers, the high-energy ionizing radiation to which the product is exposed in the present method not only enhances the biological degradation and compostability of the product, but also destroys any pathogens present in human waste that may remain in the diapers. Thus, when the product composted is the irradiated product of the invention, there is doubled assurance that the compost humus formed will be free of pathogens initially present in the used diapers.

After the waste product has been irradiated according to the present method, it is ready to undergo and is susceptible to composting treatment by contact with living microorganisms under conditions conducive to their growth, e.g. the presence of some moisture, whereby it is transformed into a humus-like material by various living microorganisms. Composting techniques such as those which have been developed for the disposing of sewage sludge and organic materials may be used.

The following example is illustrative of the method of the invention as used to produce a disposable diaper of enhanced compostability.

EXAMPLE

A commercially available disposable diaper having an essentially hydrophobic fibrous topsheet (barrier layer) of non-woven fibrous polypropylene, an essentially cellulosic absorbent layer next to the topsheet, and a polyethylene film backsheet on the opposite side of the absorbent layer was irradiated in air by means of an electron beam in two 10-Mrad passes. Irradiation caused the absorbent layer to turn tan in color, and produced an ozone odor in the product.

To test the compostability of the irradiated product, the diaper was buried in about 1-2 inches of soil in a shady location in Wilmington, Del., in May. Buried adjacent thereto was another diaper, of the same source as the first, which, however, had not been irradiated. The diapers were kept buried for six months, after which time they were retrieved and examined. In the irradiated diaper the fibrous polypropylene topsheet had fallen apart into small brittle pieces, and the absorbent layer was undetectable. The polyethylene backsheet was still intact except for some termite holes. Adhesive tabs on the diaper had become embrittled.

In the case of the unirradiated diaper, while the polyethylene backsheet also was still intact except for termite holes and the absorbent layer also was undetectable, the polypropylene topsheet was essentially unchanged.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A method of adapting a waste product containing at least one propylene polymer material for conversion to compost consisting essentially of post-use treatment of said waste product by exposing it to high-energy ionizing radiation in an oxygen-containing atmosphere at a dosage sufficient to accelerate the rate of the biological degradation of the propylene polymer material contained therein.

2. The method of claim 1 wherein the exposure of said product to radiation is effected with a radiation dose of at least about 1 megarad to 50 megarads.

3. The method of claim 2 wherein said waste product is a mass of used disposable sanitary absorbent products.

4. A method of composting a waste product containing one or more propylene polymer materials consisting essentially of the post-use treatment by:
    (a) exposing said waste product, in an oxygen-containing atmosphere, to high-energy ionizing radiation in an amount sufficient to accelerate the rate of the biological degradation of said propylene polymer material(s); and
    (b) contacting the irradiated waste product with living microorganisms attack in the presence of sufficient moisture for the growth of said microorganisms.

5. The method of claim 4 wherein said waste product is a mass of used disposable diapers.

6. A compost humus obtained by the method of claim 5.

7. A compost humus obtained by the method of claim 4.

8. A compost humus product of claim 7 wherein said propylene polymer material is present as one or more fibrous or film layers or is in molded form.

9. A compost humus product of claim 7 wherein said product is a mass of used diapers.

* * * * *